Jan. 21, 1975 E. W. HOSTETTER Re. 28,313

CARBON WATER FILTER

Original Filed Nov. 21, 1969

United States Patent Office

Re. 28,313
Reissued Jan. 21, 1975

28,313
CARBON WATER FILTER

Ernest W. Hostetter, Lincoln, Iowa, assignor to Lincoln Water Clinic, Conrad, Iowa Original No. 3,612,279, dated Oct. 12, 1971, Ser. No. 878,693, Nov. 21, 1969. Application for reissue Oct. 11, 1973, Ser. No. 405,859
Int. Cl. B01d 29/24
U.S. Cl. 210—170 15 Claims

Matter enclosed in heavy brackets [ ] appears in the original patent but forms no part of this reissue specification; matter printed in italics indicates the additions made by reissue.

ABSTRACT OF THE DISCLOSURE

A filter for liquid, including well water, comprised of four large tubes, plugged at their ends and suspended vertically as a unit within a tank. The liquid is introduced into the tank in such a manner as to be sprayed in diverse directions near the tank's bottom to assure even circulation. The circulation is through circumferential slots or perforations in the tubes, but the liquid must first pass through a filter cloth wrapped around each tube, this cloth being coated with a mixture of activated powdered carbon, diatomaceous earth, and fiber. During this flow through the mixture, the filter cloth, and into the tubes through the slots or perforations, the taste of chlorine, rust, sediment, or any other undesirable substance is removed from the liquid. The tubes are connected with each other at their tops, from which connection is an outlet for the liquid.

STATEMENT OF THE INVENTION

This invention relates to filters and, more particularly, to activated chemical filters for filtering well water and the like.

OBJECTS OF THE INVENTION

It is an object of the invention to provide an improved filter.

Another object of the invention is to provide a filter that is simple in construction, economical to manufacture, and simple and efficient to use.

DETAILED DESCRIPTION OF THE DRAWINGS

Figure 1:
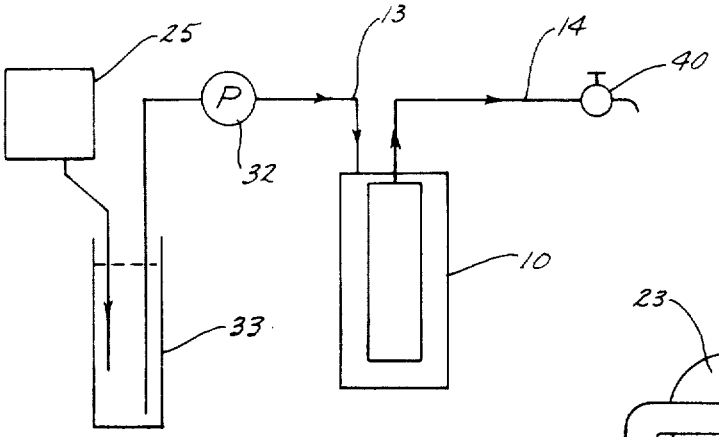
FIG. 1 is a schematic view of a filter according to the invention connected to a well.
Figure 3:
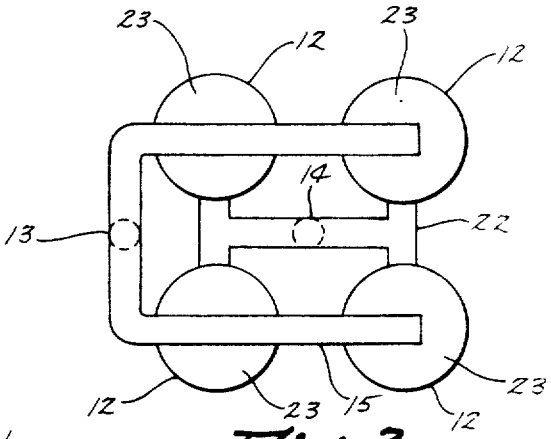
FIG. 3 is a *bottom* [top] view of the filter.

Now with more specific reference to the drawings, the filter is shown supported in a filter container which may be in the form of a tank 10, having a cover 11, inlet tube 13 and 21, and outlet tube 14 supported on the cover by *any suitable* means. [of suitable locknuts and the] *Filter elements 23 are* [filter being] disposed in the tank. The tank may be, for example, a tank 33½ inches deep and 9 inches in diameter.

The inlet pipe *13* extends down and terminates in U-shaped pipes 15 which have openings 16 *therein* [in their upper sides so that water will be directed up toward the cylinders]. The cylinders *12* have closed ends *19 and 20 which* [and] have openings 17 in their upper ends *20* which are connected to the pipes 22. [The upper ends of the pipes are plugged with plugs 20 which may be of cedar or redwood.] A filter cloth *29* [23] is wrapped around each of the hollow cylinders and is held in place by clamps 24.

The water may be supplied from a well 33 by a pump 32. Chlorine may be injected into the well from a container *or chemical feed pump* 25 and the container 10 may be connected to the outlet pipe 14 as shown.

Figure 2:
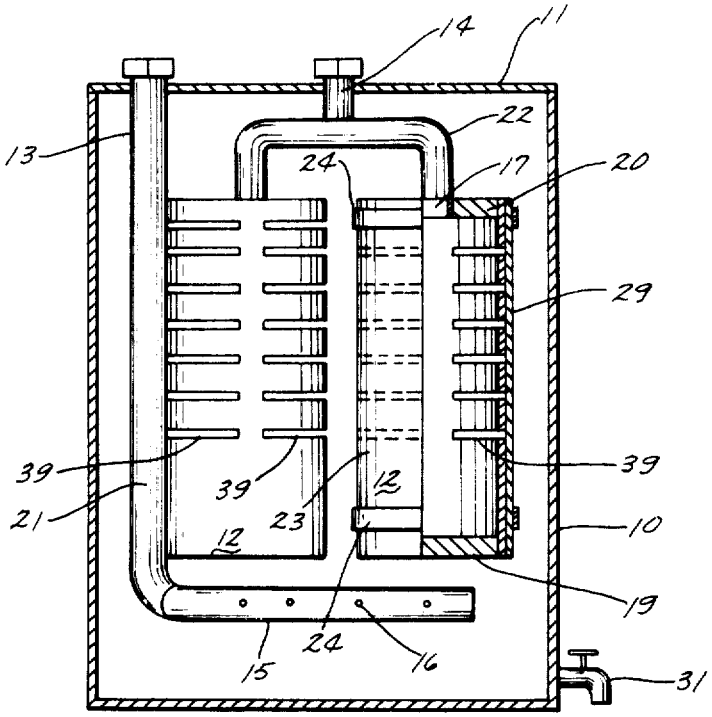
FIG. 2 is a longitudinal cross sectional view of the filter *showing one cylinder in half section and the other cylinder at the left uncovered.*

The cylinders 12 may be, for example, three inches in diameter and 33¼ inches long with three rows of slots 39 in each circumferential row. There may be 41 slots in each row, making a total of 123 slots in each tube, for example. The large tubes or hollow cylinders 12 are plugged with ¾-inch disks *19 and 20* of dried cedar or red wood at each end. The hollow cylinders *12* are covered with filter cloth *29, FIG. 2* showing the cylinder at the left uncovered for better illustration. The filter cloth 29 is held in by stainless steel clamps 24. The filter cloth *29* is precoated with a mixture of powdered, activated carbon, a material sold under the trademark "Aqua-Nuchar" prepared by the West Virginia Pulp & Paper Company of Covington, Va. and with "Fibra-Flo," which is a trademark for a product sold by the Johns-Manville Company. The "Fibra-Flo" material is a mixture of chrysotile asbestos fibers and a material known as "Hyflow Super-Cel," a trademrak owned by the Johns-Manville Company. The asbestos accounts for about 10½ per cent of the weight of the mixture. The "Hyflow Super-Cel" is a diatomoceous earth filter material.

As the chlorine in the water is drawn from the top in the filters, through the carbon precoat, the taste of chlorine and rust are removed from the water. The chlorine is placed in the well *33* [23] by means of a *container or* small chemical feed pump 25, which operates in conjunction with the water pump *32*. A *20*-gallon container may be used as a supply for chlorine indicated at 25. The chlorine may be provided by means of a five percent chlorine bleach.

The filter *elements 23 are* [core is] precoated by filling about eight inches of water in the bottom of the tank 10, then *the* precoat material is thoroughly mixed in. The tank is then filled to within eight inches to ten inches of the top and well mixed. Then the core is gradually lowered into the tank and the cover *replaced* [bolted in place]. The water is then allowed to flow from the filter through *pipe 14* [a faucet] to a drain until it is clear and all the fine particles of carbon are washed out. The filter is then ready for use.

When the flow of water through the filter has deminished below the desired rate of flow, the core, *including filter elements 23*, is removed, washed off of old carbon and rust and new charge is put in. *The* [and the] filter is *then* ready for reuse. The tank *10* may be drained by faucet 31.

The foregoing specification sets forth the invention in its preferred practical forms, but the structure shown is capable of modification within a range of equivalents without departing from the invention which is to be understood is broadly novel as is commensurate with the appended claims.

The embodiments of the invention which an exclusive property or privilege is claimed are defined as follows:

[1. A filter comprising at least one hollow cylinder plugged at each end, a pipeline connected in series with the inside of said cylinder, said cylinder having openings formed in its outside surface, a filter cloth disposed around the outside of said cylinder, a container, said cylinder being disposed in said container, said pipe being adapted to be connected to a water supply, and outlet means from said container, at least four said cylinders being provided, said cylinders having closed ends, said cylinders being disposed in side-by-side relation, a tank said cylinders being supported in said tank, a pipe connected to the top of said tank and terminating in a generally U-shaped portion disposed below said cylinders, said U-shaped portion of said pipe having spaced openings therein, an outlet pipe connected through said container to the outside thereof, openings in the side wall of each said cylinder, and a filter web disposed around each said cylinder, said web being coated with a material containing activated carbon, said tank being connected to a water supply from a well containing iron and chlorine, a pump for pumping said water from said well to said filter, a dispensing means connected to said well for introducing chloride into said well.]

[2 The filter recited in claim 1 wherein said filter web is held in place by straplike clamps.]

[3 The filter recited in claim 1 wherein said filter web is a filter clothlike material.]

[4 The filter recited in claim 3 wherein said outlet pipe is connected to two generally U-shaped pipes, one connected to the closed end of each said cylinder.]

[5. The filter recited in claim 4 wherein each said cylinder has a plurality of circumferentially disposed slots.]

[6 The filter recited in claim 1 wherein means is provided for directing water from the inlet pipe to a position below said cylinders.]

*7 A filter comprising*

*a tank;*

*inlet means for delivering liquid to said tank;*

*a filter element disposed in said tank including:*

*a chamber formed by a cylinder having openings therein,*

*a filter cloth disposed around said cylinder and covering said openings, said filter cloth being secured tightly at each end thereof and round the cylinder, said filter cloth being precoated with a mixture of asbestos fibers, powdered activated carbon and diatomaceous each filter material; and*

*outlet means for delivering liquid from said chamber to the outside of said tank.*

*8 The filter of claim 7 wherein the inlet means comprises a pipe extending to a point near the bottom of said tank.*

*9. The filter of claim 8 wherein said pipe has a portion having series of small orifices therein at the point near the bottom of the tank.*

*10 The filter of claim 9 wherein the portion of the pipe having the orifices therein is U-shaped and lies in a plane generally parallel to the bottom of the tank.*

*11. The filter of claim 7 wherein the openings in said cylinder are in the shape of an elongated slot.*

*12 The filter of claim 7 wherein the cylinder has wooden caps in the ends thereof to thereby form ends for the chamber.*

*13 The filter of claim 7 wherein a plurality of filter elements are disposed in said tank and connected to said outlet means.*

*14. The filter of claim 13 wherein said outlet means comprises a manifold having a passageway connecting the inside of the tank with the outside of the tank and a series of pipes connecting each respective chamber to said passageway.*

*15 The filter of claim 13 wherein the number of filter elements is four.*

*16 The filter of claim 7 wherein a pipeline is attached in series with the outlet means.*

*17 The filter of claim 7 wherein said tank has a draining means for draining the tank.*

*18 The filter of claim 7 wherein a chlorine dispensing means is connected upstream of said inlet means.*

*19. The filter of claim 7 wherein said inlet means is connected to a water supply.*

*20. The filter of claim 7 wherein said tank is enclosed at the top thereof to form a pressure tank.*

*21 A filter comprising:*

*a tank;*

*inlet means for delivering liquid to said tank entering the top of said tank and terminating in a U-shaped portion having orifices therein near the bottom of the tank, said U-shaped portion lying in a plane generally parallel to the bottom of the tank;*

*a filter element disposed in said tank including:*

*a chamber formed by a cylinder having slot shaped openings therein;*

*a filter cloth disposed around said cylinder and covering said openings, said filter cloth being secured tightly at each end thereof and around the cylinder; and outlet means at the top of the tank for delivering liquid from said chamber to the outside of said tank.*

References Cited

The following references, cited by the Examiner, are of record in the patented file of this patent or the original patent.

UNITED STATES PATENTS

| | | | |
|---|---|---|---|
| 585,497 | 6/1897 | Aufrichtig | 210—456 X |
| 3,327,859 | 6/1967 | Pall | 210—266 |
| 539,800 | 5/1895 | Durant | 210—460 |
| 1,591,229 | 7/1926 | Oliver et al | 210—333 X |
| 1,905,919 | 4/1933 | Levis | 210—460 |
| 2,249,020 | 7/1941 | McFarlin | 210—460 |
| 2,625,273 | 1/1953 | Schuller | 210—333 X |
| 2,820,701 | 1/1958 | Leslie | 210—289 X |
| 3,276,588 | 10/1966 | Nehrbass et al. | 210—289 X |
| 2,269,725 | 1/1942 | Malanowski | 210—193 X |

FRANK A. SPEAR, JR., Primary Examiner

U.S. Cl. X R.

210—206, 323, 460, 497.